US009912541B2

(12) United States Patent
Sekido

(10) Patent No.: US 9,912,541 B2
(45) Date of Patent: Mar. 6, 2018

(54) NETWORK MANAGEMENT APPARATUS, LINE CONDITION IMPROVEMENT METHOD, AND NON-TRANSITORY COMPUTER READABLE MEDIUM STORING PROGRAM

(71) Applicant: NEC Corporation, Tokyo (JP)

(72) Inventor: Masanori Sekido, Tokyo (JP)

(73) Assignee: NEC Corporation, Tokyo (JP)

( * ) Notice: Subject to any disclaimer, the term of this patent is extended or adjusted under 35 U.S.C. 154(b) by 82 days.

(21) Appl. No.: 14/909,022

(22) PCT Filed: Jul. 7, 2014

(86) PCT No.: PCT/JP2014/003590
§ 371 (c)(1),
(2) Date: Jan. 29, 2016

(87) PCT Pub. No.: WO2015/015715
PCT Pub. Date: Feb. 5, 2015

(65) Prior Publication Data
US 2016/0173336 A1 Jun. 16, 2016

(30) Foreign Application Priority Data
Jul. 30, 2013 (JP) .................................. 2013-157611

(51) Int. Cl.
*G01R 31/08* (2006.01)
*H04L 12/24* (2006.01)
(Continued)

(52) U.S. Cl.
CPC ...... *H04L 41/0896* (2013.01); *H04L 41/0823* (2013.01); *H04L 41/0883* (2013.01);
(Continued)

(58) Field of Classification Search
CPC .................................................. H04L 41/0896
See application file for complete search history.

(56) References Cited

U.S. PATENT DOCUMENTS 8,422,424 B1    4/2013 VonFeldt et al.
9,167,457 B2 * 10/2015 Ponnuswamy ......... H04L 41/22
(Continued)

FOREIGN PATENT DOCUMENTS

EP    1513360 A2    3/2005
EP    2209257 A1    7/2010
(Continued)

OTHER PUBLICATIONS

Cisco, User Guide for ASA CX and Cisco Prime Security Manager 9.1, Cisco Systems, Inc., 2011-2013 (370 total pages).
(Continued)

*Primary Examiner* — Gerald Smarth
(74) *Attorney, Agent, or Firm* — Wilmer Cutler Pickering Hale and Dorr LLP

(57) ABSTRACT

A network management apparatus 20 includes a line condition determination unit (203) and an improvement information generation unit (204). The line condition determination unit (203) receives a line communication condition of network equipment (31) and determines as to whether or not the line communication condition satisfies a predetermined condition. The line condition determination unit (203) notifies the improvement information generation unit (204) when the predetermined condition is satisfied. The improvement information generation unit (204) obtains operation information relating to the network equipment (31). After the improvement information generation unit (204) has received the notification from the line condition determination unit (203), the improvement information generation unit (204) generates and outputs improvement information that describes means for improving the line condition of the
(Continued)

network equipment (31) based on the operation information. Thus, it is possible to offer the means for improving a radio line condition without requiring user's time and effort.

25 Claims, 11 Drawing Sheets

(51) Int. Cl.
H04W 24/02 (2009.01)
H04L 12/26 (2006.01)
H04W 88/18 (2009.01)

(52) U.S. Cl.
CPC .......... H04L 43/0811 (2013.01); H04L 43/16 (2013.01); H04W 24/02 (2013.01); H04L 41/082 (2013.01); H04W 88/18 (2013.01)

(56) References Cited

U.S. PATENT DOCUMENTS

| 2005/0048965 | A1 | 3/2005 | Ebata | |
| 2007/0064620 | A1* | 3/2007 | Defoort | H04L 41/0806 370/252 |
| 2007/0233854 | A1 | 10/2007 | Bukovec et al. | |
| 2009/0175199 | A1* | 7/2009 | Trojer | H04L 12/2856 370/254 |
| 2010/0174229 | A1* | 7/2010 | Hsu | A61M 5/142 604/66 |
| 2010/0254323 | A1* | 10/2010 | Youn | H04L 1/0003 370/329 |
| 2011/0051906 | A1* | 3/2011 | Cioffi | H04B 3/32 379/32.04 |

FOREIGN PATENT DOCUMENTS

| JP | 2001-265859 A | 9/2001 |
| JP | 2005-080141 A | 3/2005 |
| JP | 2009-141562 A | 6/2009 |
| JP | 2011-009974 A | 1/2011 |
| JP | 2012-253622 A | 12/2012 |

OTHER PUBLICATIONS

Extended European Search Report issued by the European Patent Office for European Application No. 14832361.1 dated Mar. 1, 2017 (9 pages).

International Search Report, corresponding to PCT/JP2014/003590, dated Sep. 2, 2014, 2 pp.

Ericsson Japan Kabushiki Kaisha, "OSS/BSS Service Hinshitsu Kanri," [online—URL: http://www.ericsson.com/res/site_JP/the company/ericsson_jp/doc/oss_bss.pdf] May 30, 2012, 24 pp.

* cited by examiner

| PARAMETER NAME | POSSIBLE VALUES |
|---|---|
| Radio Capacity | 10Mbps / 20Mbps / 50Mbps / 100Mbps / 150Mbps / 200Mbps / 300Mbps / 400Mbps / 500Mbps |
| Radio Bit Rate | Not Available / AMR |
| Modulation | QPSK / 16QAM / 32QAM / 64QAM / 128QAM / 256QAM / 512QAM / 1024QAM / 2048QAM |
| XPIC | Not Available / Available |
| Radio Traffic Aggregation | Not Available / Available |
| — | — |

Fig. 3

| PARAMETER NAME | NETWORK EQUIPMENT 31 | NETWORK EQUIPMENT 32 | ... |
|---|---|---|---|
| Radio Capacity | 100Mbps | 50Mbps | --- |
| Radio Bit Rate | Available | Not Available | --- |
| Modulation | 128QAM | 32QAM | --- |
| XPIC | Not Available | Available | --- |
| Radio Traffic Aggregation | Not Available | Not Available | --- |
| ... | --- | --- | --- |

Fig. 4

| MODEM | POSSIBLE VALUES |
|---|---|
| Radio Traffic Aggregation CARD | MAX 512QAM TYPE/ MAX 2048QAM TYPE |
| — | NOT PROVIDED/PROVIDED |
| — | — |

Fig. 5

| PARAMETER NAME | SET LICENSE |
|---|---|
| Radio Capacity | 50Mbps |
| Radio Bit Rate | Not Available |
| Modulation | 32QAM |
| XPIC | Not Available |
| Radio Traffic Aggregation | Not Available |
| --- | --- |

Fig. 6

SETTING INFORMATION

```
Radio Capacity : 50Mbps
Radio Bit Rate : Not Available
Modulation : 32QAM
XPIC : Not Available
Radio Traffic Aggregation : Not Available
```

APPLIED LICENSE INFORMATION

```
Radio Capacity : 100Mbps
Radio Bit Rate : AMR
Modulation : 128QAM
XPIC : Not Available
Radio Traffic Aggregation : Not Available
```

PURCHASED LICENSE INFORMATION

```
Radio Capacity : 200Mbps
Radio Bit Rate : AMR
Modulation : 128QAM
XPIC : Not Available
Radio Traffic Aggregation : Not Available
```

APPARATUS INFORMATION

```
MODEM : MAX 2048QAM TYPE
Radio Traffic Aggregation CARD : NOT PROVIDED
```

| PARAMETER NAME | CHANGE SETTING | APPLY LICENSE | PURCHASE LICENSE |
|---|---|---|---|
| Radio Capacity | Available<br>50Mbps –> 100Mbps [EXECUTE] 41 | Available<br>50Mbps –> 200Mbps [EXECUTE] | Available<br>50Mbps –> 300Mbps [EXECUTE]<br>50Mbps –> 400Mbps [EXECUTE]<br>50Mbps –> 500Mbps [EXECUTE] |
| Radio Bit Rate | Available [EXECUTE] | — | — |
| Modulation | Available<br>32QAM –> 64QAM [EXECUTE]<br>32QAM –> 128QAM [EXECUTE] | | Available<br>64QAM –> 256QAM [EXECUTE]<br>64QAM –> 512QAM [EXECUTE]<br>64QAM –> 1024QAM [EXECUTE]<br>64QAM –> 2048QAM [EXECUTE] |
| XPIC | Not Available | Not Available | Available [EXECUTE] |
| Radio Traffic Aggregation | Not Available | Not Available | Not Available |

NETWORK MANAGEMENT APPARATUS, LINE CONDITION IMPROVEMENT METHOD, AND NON-TRANSITORY COMPUTER READABLE MEDIUM STORING PROGRAM

CROSS-REFERENCE TO RELATED APPLICATIONS

The present application is a national stage application of International Application No. PCT/JP2014/003590 entitled "Network Management Apparatus, Line Condition Improvement Method, and Non-Transitory Computer Readable Medium Storing Program," filed on Jul. 7, 2014, which claims the benefit of priority from Japanese Patent Application No. JP2013-157611, filed on Jul. 30, 2013, the disclosures of which are incorporated herein in their entirety by reference thereto.

TECHNICAL FIELD

The present invention relates to a network management apparatus, a line condition improvement method, and a non-transitory computer readable medium storing a program.

BACKGROUND ART

In recent years, a network management apparatus that manages Network Equipment (NE) which is connected to mobile phone base stations and the like has been widely used. This network management apparatus has a function to manage, for example, a radio line usage rate of each piece of network equipment and the like. When the radio line usage rate of each piece of network equipment is high (e.g. greater than or equal to a certain threshold), it is desirable to improve the line usage rate.

As a technique relating to the improvement of the radio line usage rate, there is, for example, the following literature. Patent Literature 1 discloses a network control apparatus that can switch communication schemes while effectively using radio resources. Further, Patent Literature 2 discloses an apparatus for trading a right to use electric communication equipment that can share an electric communication equipment capacity with another communication company when there is a deficiency of electric communication equipment capacity.

CITATION LIST

Patent Literature 1: Japanese Unexamined Patent Application Publication No. 2009-141562
Patent Literature 2: Japanese Unexamined Patent Application Publication No. 2001-265859

SUMMARY OF INVENTION

Technical Problem

By the way, the above-mentioned network equipment has various functions. These various functions may be operated in such a way that the functions are enabled/disabled according to license management and a setting. That is, availability of each function is switched according to a state of a license (whether or not the license has been purchased, whether or not the license is applied, whether or not a setting regarding the license has been performed or the like).

When it is necessary to improve the radio line condition of the network equipment, a user of the network equipment (preferably an administrator) changes the setting regarding the license of each function to thereby improve the radio line condition. The administrator, for example, purchases/applies/sets a license of an upper limit value of a radio capacity that is greater than an upper limit value of a current radio capacity so as to improve the radio line condition. However, it is necessary for the user himself or herself to determine as to whether or not to purchase or apply the license, which requires the user's time and effort (incurs personnel expenses).

Note that the above-mentioned Patent Literature 1 and 2 neither indicates nor teaches a change in the setting regarding the license so as to improve the condition of radio communication.

The present invention has been made in light of the above-mentioned problem, and an exemplary object of the present invention is to provide a network management apparatus, a license management method, and a non-transitory computer readable medium storing a program that can present means for improving a radio line condition without requiring user's time and effort.

Solution to Problem

An exemplary aspect of the present invention is a network management apparatus including: line condition determination means for determining as to whether or not a line condition of a communication apparatus satisfies a predetermined condition, in which the line condition is obtained from the connected communication apparatus; and improvement information generation means for generating improvement information based on operation information when the line condition is determined to satisfy the predetermined condition, in which the improvement information is information that describes means for improving the line condition, and the operation information is information regarding an operation of the communication apparatus.

Another exemplary aspect of the present invention is a non-transitory computer readable medium storing a program for causing a computer to execute: a line condition determination step for determining as to whether or not a line condition of a communication apparatus satisfies a predetermined condition; and an improvement information generation step for generating improvement information based on operation information when the line condition is determined to satisfy the predetermined condition, in which the improvement information describes means for improving the line condition, and the operation information relates to an operation of the communication apparatus.

Another exemplary aspect of the present invention is a method of improving a line condition that includes: a line condition determination step for determining as to whether or not a line condition of a communication apparatus satisfies a predetermined condition; and an improvement information generation step for generating improvement information based on operation information when the line condition is determined to satisfy the predetermined condition, in which the improvement information describes means for improving the line condition, and the operation information relates to an operation of the communication apparatus.

Another exemplary aspect of the present invention is a network management apparatus that manages a connected communication apparatus and includes: a display unit that displays a use state of each function of the communication apparatus and improvement information that describes means for improving a line condition of the communication apparatus. The display unit displays at least one of an execution of a setting change of each functional parameter of the communication apparatus, an execution of a license application of each functional parameter of the communication apparatus, and an execution of a license purchase of each functional parameter of the communication apparatus.

Another exemplary aspect of the present invention is a management apparatus of a communication apparatus that; stores functional parameter information indicating availability of each function included in the communication apparatus; and instructs display means to display suggestion information for improving a line condition of the communication apparatus. The suggestion information includes information indicating a change in the functional parameter information, and the suggestion information further includes information indicating an application or a purchase of a license necessary for the change in the functional parameter information.

Advantageous Effects of Invention

The present invention can provide a network management apparatus, a license management method, and a non-transitory computer readable medium that can present means for improving a radio line condition without requiring user's time and effort.

BRIEF DESCRIPTION OF DRAWINGS

FIG. 3 is a drawing showing a specific example of types of licenses of each function of communication apparatuses 31 to 3N according to the first exemplary embodiment;

FIG. 4 is a drawing showing a management table of a license purchase state managed by a storage unit 101 according to the first exemplary embodiment;

FIG. 5 is a drawing showing an example of apparatus configuration information of the communication apparatuses 31 to 3N according to the first exemplary embodiment;

FIG. 6 is a drawing showing an example of setting information of the communication apparatuses 31 to 3N according to the first exemplary embodiment;

FIG. 8 is a drawing showing an example of operation information (setting information, applied license information, purchased license information, and apparatus configuration information) of the network equipment 31 according to the first exemplary embodiment;

FIG. 9 shows an interface screen generated by an improvement information generation unit 204 according to the first exemplary embodiment;

DESCRIPTION OF EMBODIMENTS

First Exemplary Embodiment

Figure 1:
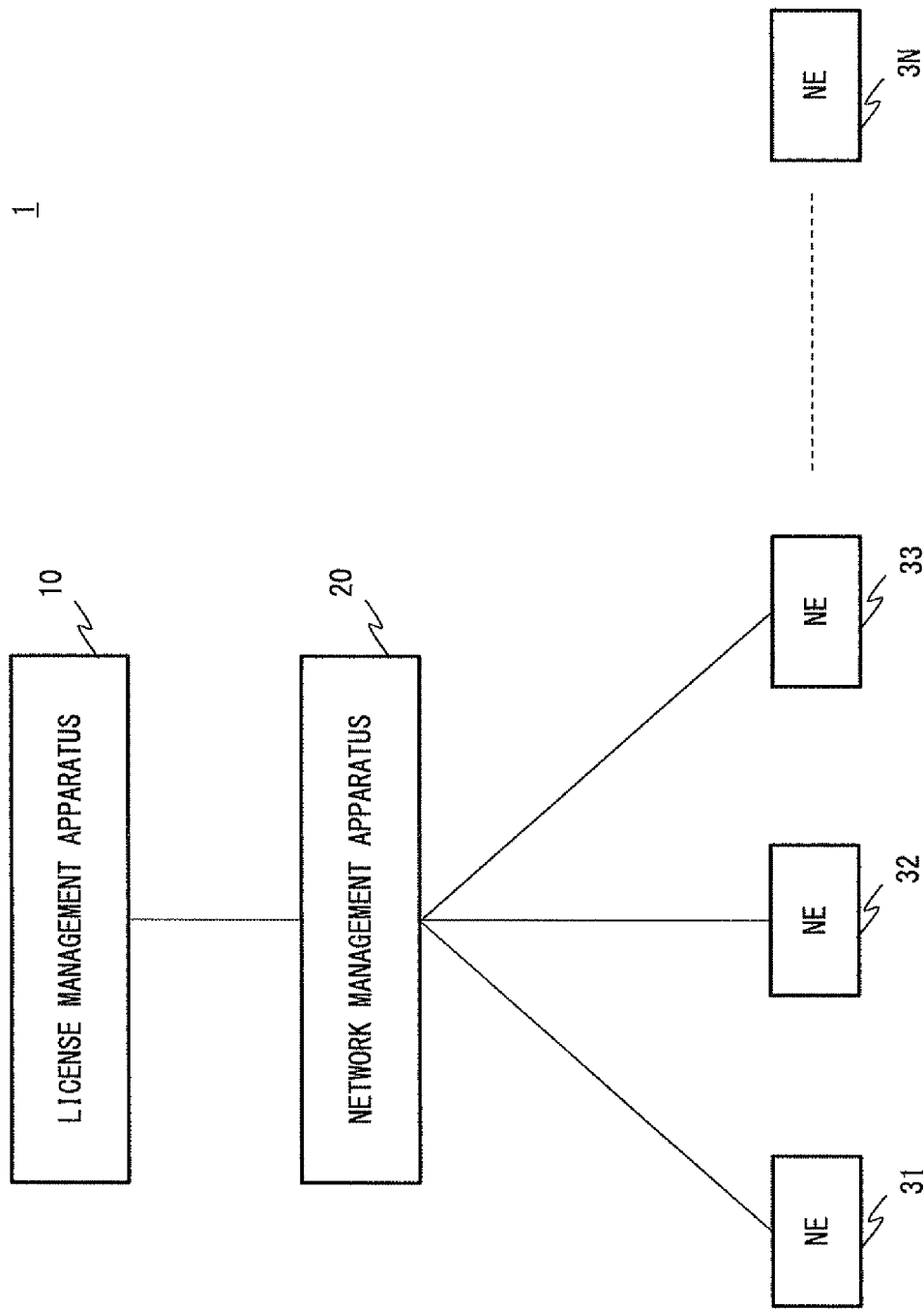
FIG. 1 is a block diagram showing an entire image of a network system 1 according to a first exemplary embodiment.

Hereinafter, an exemplary embodiment of the present invention shall be explained with reference to the drawings. Firstly, an overview of a network system including a network management apparatus according to this exemplary embodiment shall be explained by referring to FIG. 1.

A network system 1 includes a license management apparatus 10, a network management apparatus 20 (may also be referred to as an NMS (Network Management System)), and a plurality of pieces of network equipment 31 to 3N.

The network equipment 31 to 3N is communication equipment connecting, for example, mobile phone base stations and the like. Various functions are implemented in the network equipment 31 to 3N. These various functions are enabled (become available) when licenses of the functions have been purchased, the licenses have been applied to the apparatus, and appropriate settings have been performed.

Note that, in general, the network equipment 31 to 3N is equipment owned and managed by a communication company. On the other hand, in general, the license management apparatus 10 and the network management apparatus 20 are apparatuses that are owned and managed by a vendor of a communication apparatus. The vendor provides the network equipment 31 to 3N including multiple functions implemented therein and provides licenses by a method described later, so that each function of the network equipment 31 to 3N can operate without a problem in terms of the license. The communication company receives a license permission of the function which the communication company intends to use and then operates the equipment. Note that such a relationship between the communication company and the vendor is a general model case, and it is obvious that an operation can be performed by other forms.

The network management apparatus 20 is connected to the plurality of pieces of the network equipment 31 to 3N and manages these pieces of the network equipment 31 to 3N. Note that although it is not a generally used operation, it is theoretically possible that the network management apparatus 20 can be configured to manage a single piece of the network equipment 31. A specific configuration and operation of the network management apparatus 20 shall be explained with reference to FIG. 2 and the like.

The license management apparatus 10 manages a license key of each function of the network equipment 31 to 3N. To be more specific, the license management apparatus 10 manages as to whether or not the license key of each function of the network equipment 31 to 3N has been purchased (whether or not a use of the function has been permitted by a license supplier) and manages sales of the license keys via a network. A specific configuration of the license management apparatus 10 shall be explained with reference to FIG. 2.

Figure 2:
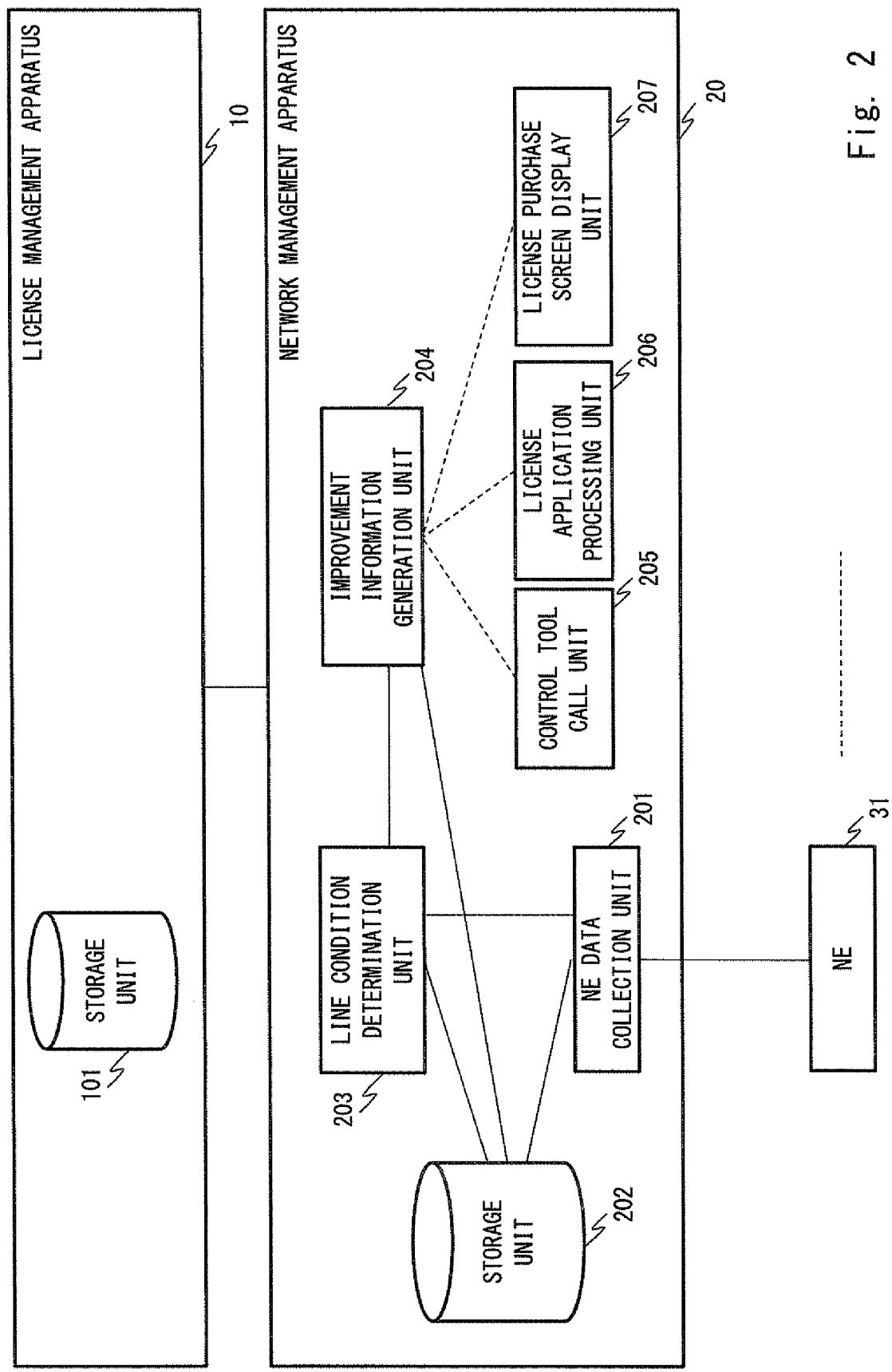
FIG. 2 is a block diagram showing a specific configuration of a network management apparatus 20 according to the first exemplary embodiment.

FIG. 2 is a block diagram showing a specific configuration of the network management apparatus 20. The network management apparatus 20 includes an NE data collection unit 201, a storage unit 202, a line condition determination unit 203, an improvement information generation unit 204, a control tool call unit 205, a license application processing unit 206, and a license purchase screen display unit 207. Further, the license management apparatus 10 includes a storage unit 101.

The storage unit 101 inside the license management apparatus 10 manages purchase information of the license key of each function of the network equipment 31 to 3N. FIG. 3 shows a specific example of types of licenses of the function. Moreover, FIG. 4 shows an example of a management table of license purchase states managed by the storage unit 101. As shown in FIG. 3, a license type differs for each parameter (Radio Capacity, Radio Bit Rate, Modulation, XPIC, and Radio Traffic Aggregation) indicating each function. In the case of, for example, the function parameter "Radio Capacity", license values can be 10 Mbps, 20 Mbps, 50 Mbps, 100 Mbps, 150 Mbps, 200 Mbps, 300 Mbps, 400 Mbps, and 500 Mbps.

Next, the management table (FIG. 4) of the license purchase states managed by the storage unit 101 will be referred to. As shown in the drawing, purchased licenses for respective functions of the network equipment 31 to 3N are managed. In FIG. 4, the storage unit 101 stores the information that a license of ("Radio Capacity=100 Mbps, Radio Bit Rate=Available, and Modulation=128 QAM") has been purchased for the network equipment 31 (no license has been purchased for "XPIC" and "Radio Traffic Aggregation"). The storage unit 101 is comprised of, for example a software database. In the following explanation, the information shown in FIG. 4 shall also be referred to as purchased license information.

Note that in this exemplary embodiment, a "purchased license", an "applied license", and "set license" have different concepts. The term "purchased" indicates that a purchase process for a license of a certain functional parameter of target network equipment (any one piece of 31 to 3N) has been completed (a state, for example, in which a money transfer to purchase the license has been completed, and a use of the functional parameter has been permitted by the license supplier). On the other hand, the term "applied" indicates that a license of a certain functional parameter of target network equipment (any one of 31 to 3N) has been purchased, and the target network equipment (any one piece of 31 to 3N) recognizes that the license is enabled (a software setting (e.g. a flag setting) has been performed). Moreover, the term "set" indicates that a license of a certain functional parameter has been applied to the target network equipment (any one piece of 31 to 3N), and a setting for an actual operation has been performed (e.g. an appropriate setting has been written in a setting file).

Reference will be made again to FIG. 2. The NE data collection unit 201 receives apparatus configuration information, setting information, applied license information, and line communication information from each network equipment (31 to 3N). Note that in the following explanation, for clarity of the explanation, although a process in which the NE data 201 and another processing unit (e.g. the line condition determination unit 203) process various pieces of information collected from the network equipment 31 will be explained, information will be collected from and processes will be performed on the network equipment 32 to 3N which is equipment other than the network equipment 31 in a manner similar to the collection process for the network equipment 31.

The apparatus configuration information is information indicating a physical configuration of the network equipment 31 and includes, for example as shown in FIG. 5, hardware information such as a modem type, whether or not an aggregation card is provided and the like. The setting information is, as shown in FIG. 6, information indicating a setting of each functional parameter in each piece of the network equipment 31. In the example of FIG. 6, for example, the NE data collection unit 201 is notified that the network equipment 31 which has transmitted this setting information operates at "Radio Capacity=50 Mbps . . . ". The applied license information is information indicating as to whether or not the license of each functional parameter has been applied to the network equipment 31. A data format of the applied license information should be substantially the same as that of the setting information.

Further, the line communication information is information including a radio line usage amount (bps) that is currently used by the network equipment 31 which is a sender. The NE data collection unit 201 uses a mechanism of RMON (Remote network MONitoring) or the like to obtain the line communication information from the network equipment 31.

The NE data collection unit 201 stores the collected apparatus configuration information, applied license information, and setting information in the storage unit 202 and notifies the line condition determination unit 203 of the collected line communication information.

The storage unit 202 stores the apparatus configuration information, the applied license information, and the setting information of each network equipment 31 to 3N that has been collected by the NE data collection unit 201. Further, the storage unit 202 holds each piece of data used as a threshold of the line condition determination unit 203, in which the threshold will be explained later. The threshold determination storage unit 202 is comprised of, for example, a software database.

Figure 7:
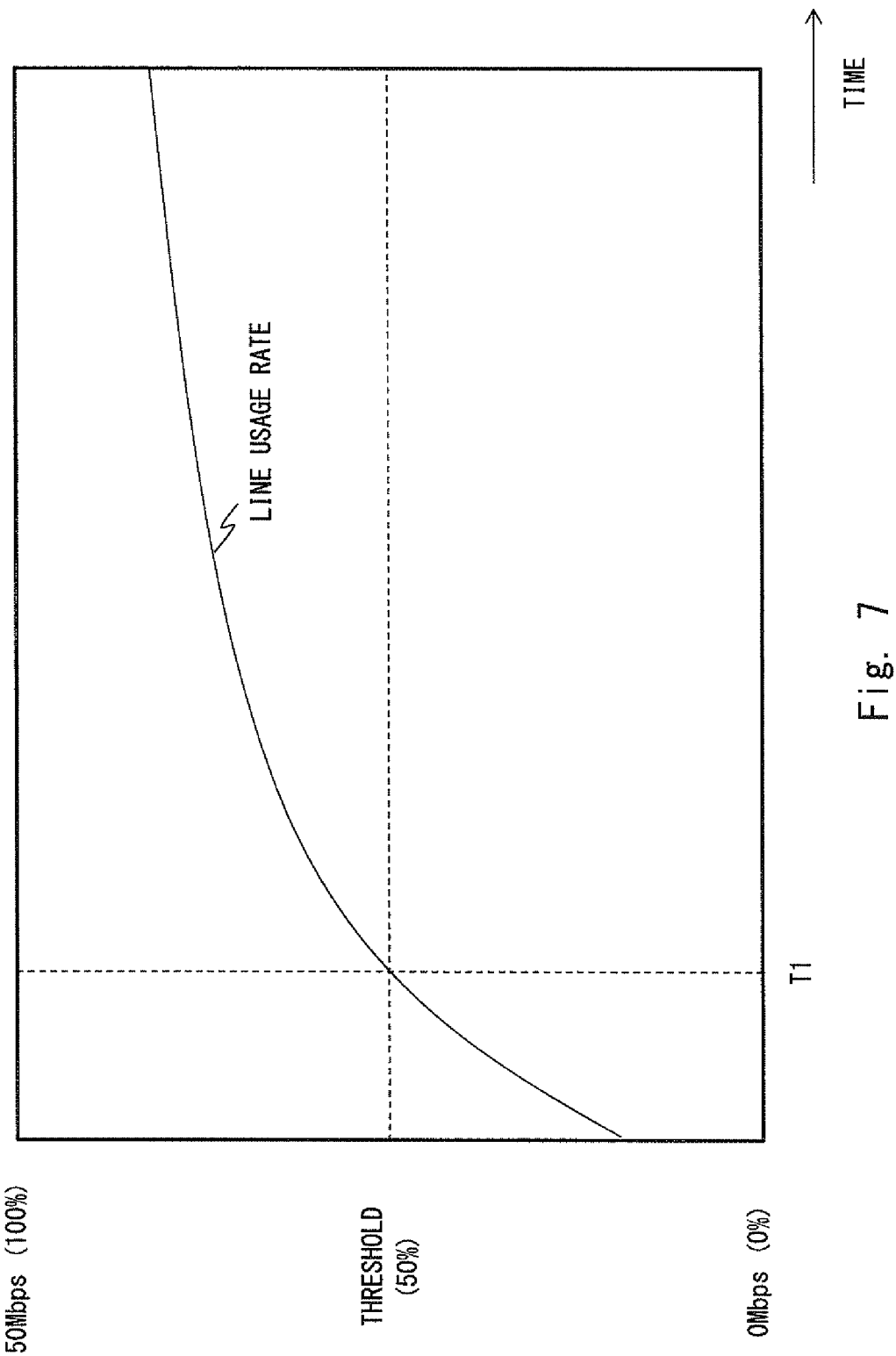
FIG. 7 is a conceptual diagram showing a condition determination of network equipment 31 (to 3N) by a line condition determination unit 203 according to the first exemplary embodiment.

The line condition determination unit 203 determines as to whether or not the radio line usage rate of the network equipment 31 satisfies a predetermined condition. FIG. 7 is a conceptual diagram showing an example of the determination. The line condition determination unit 203 obtains the current radio capacity that is the setting information of the network equipment 31 which is a target of the determination. Moreover, the line condition determination unit 203 obtains the threshold of the network equipment 31 from the storage unit 202. Note that a user can change the threshold for each piece of network equipment on an arbitrary interface.

The line condition determination unit 203 sequentially determines as to whether or not the radio line usage rate of the network equipment 31 exceeds the threshold. In FIG. 7, the line condition determination unit 203 sequentially determines as to whether or not the radio line usage rate of the network equipment 31 exceeds the threshold (50% of an upper limit value). The line condition unit 203 notifies the improvement information generation unit 204 at a timing T1 which is a timing when the radio line condition rate exceeds the threshold.

Note that the line condition determination unit 203 may use information that can be obtained by RMON other than the radio line usage rate to make a conditional determination. Alternatively, the line condition determination unit 203 may make the conditional determination not only by a simple comparison between the threshold and the radio line usage rate but also by considering as to whether or not another condition is satisfied (e.g. an increase rate of the radio line usage rate per unit time is greater than or equal to a predetermined value). That is, the line condition determination unit 203 may perform any kind of determination as long as it is to determine as to whether or not the line condition of the network equipment 31 (a condition regarding the radio line usage rate) satisfies a predetermined condition (i.e. a determination as to whether or not the line condition is congested).

Next, an operation of the improvement information generation unit 204 shall be explained. When the improvement information generation unit 204 receives the notification from the line condition determination unit 203, the improvement information generation unit 204 generates and outputs improvement information regarding the line information for the network equipment 31 based on operation information that is used to operate the network equipment 31. The operation information is used for (or related to) the operation of the network equipment 31 and includes the apparatus configuration information, the setting information, and the applied license information that is obtained from the network equipment 31, and the purchased license information (FIG. 4) that is managed by the storage unit 101. The improvement information generation unit 204 obtains the purchased license information from the license management apparatus 10 as appropriate. The improvement information output from the improvement information generation unit 204 is information that describes means (way, method) for improving the line condition and is, for example, a user interface (FIG. 9) or the like which will be described later. Hereinafter, an operation of the improvement information generation unit 204 shall be explained using a specific data example of FIG. 8.

FIG. 8 is a drawing showing an example of the operation information (the setting information, the applied license information, the purchased license information, and the apparatus configuration information) of the network equipment 31 when the improvement information generation unit 204 has received the notification from the line condition determination unit 203.

The improvement information generation unit 204 calculates a possible process for improving the line condition for each functional parameter based on this operation information. Hereinafter, a calculation process for each functional parameter shall be explained.

The functional parameter "Radio Capacity" shall be examined as follows. The improvement information generation unit 204 recognizes that a current setting value is "50 Mbps", an upper limit of a license that can be applied to an apparatus is "100 Mbps", and an upper limit of a purchased license is "200 Mbps". Thus, the improvement information generation unit 204 determines that changing a setting of the functional parameter "Radio Capacity" and applying the license up to the upper limit of the functional parameter "Radio Capacity" and changing the setting is effective for improving the line condition. Moreover, the improvement information generation unit 204 determines that it is possible to purchase a license of more than or equal to "300 Mbps" ("300 Mbps", "400 Mbps", and "500 Mbps"). Note that the improvement information generation unit 204 refers to the apparatus configuration information, determines as to whether or not the apparatus supports the parameter value ("Radio Capacity"), and if the apparatus does not support the parameter value ("Radio Capacity"), determines that it is not possible to improve the line condition using this parameter.

The functional parameter "Radio Bit Rate" shall be examined as follows. The improvement information generation unit 204 recognizes that a current setting value is "Not Available", a license that can be applied to the apparatus is "AMR", and a purchased license is "AMR". Thus, the improvement information generation unit 204 determines that changing a setting of the functional parameter "Radio Bit Rate" is effective for improving the line condition. Note that the improvement information generation unit 204 refers to the apparatus configuration information, determines as to whether or not the apparatus supports the parameter value ("Radio Bit Rate"), and if the apparatus does not support the parameter value ("Radio Bit Rate"), determines that it is not possible to improve the line condition using this parameter.

The functional parameter "Modulation" shall be examined as follows. The improvement information generation unit 204 recognizes that a current setting value is "32 QAM", a license that can be applied to the apparatus is "128 QAM", and a purchased license is "128 QAM". Accordingly, the improvement information generation unit 204 determines that changing a setting of the functional parameter "Modulation" is effective for improving the line condition. The improvement information generation unit 204 also recognizes that it is possible to change the setting of the functional parameter "Modulation", namely, change the setting to "64 QAM" and "128 QAM". Moreover, the improvement information generation unit 204 recognizes that a parameter "MODEM" of the apparatus configuration information is a "MAX 2048 QAM type" and determines that it is possible to further purchase licenses ("256 QAM", "512 QAM", "1024 QAM", and "2048 QAM") of the functional parameter "Modulation".

Next, the functional parameter "XPIC" shall be examined as follows. The improvement information generation unit 204 recognizes that a current setting value is "Not Available", a license that can be applied to the apparatus is "Not Available", and a purchased license is "Not Available". Thus, the improvement information generation unit 204 determines that purchasing a license for the functional parameter "XPIC", applying the purchased license, and then changing a setting is effective for improving the line condition. Note that the improvement information generation unit 204 refers to the apparatus configuration information, determines as to whether or not the apparatus supports the parameter value ("XPIC"), and if the apparatus does not support the parameter value ("XPIC"), determines that it is not possible to improve the line condition using this parameter.

Lastly, the functional parameter "Radio Traffic Aggregation" shall be examined as follows. The improvement information generation unit 204 recognizes that a current setting value is "Not Available", a license that can be applied to the apparatus is "Not Available", and a purchased license is "Not Available". Further, the improvement information generation unit 204 recognizes that there is no "Radio Traffic Aggregation card" from the apparatus configuration information. Accordingly, the improvement information generation unit 204 determines that it is not possible to improve the line condition regarding the functional parameter "Radio Traffic Aggregation".

Note that when the improvement information generation unit 204 can determine that the "Radio Traffic Aggregation card" is not provided from the apparatus configuration information but there is a slot into which the "Radio Traffic Aggregation card" will be inserted, the improvement information generation unit 204 may determine that it is possible to improve the line condition by inserting the "Radio Traffic Aggregation card", purchasing a license, applying the license, and changing a setting.

As has been explained above, the improvement information generation unit 204 calculates a difference between values of the setting information, the applied license information, and the purchased license information of each parameter and calculates means for improving the line condition based on the difference. Further, the improvement information generation unit 204 refers to the apparatus configuration information in order to calculate improvement means that is impossible to be achieved by the network equipment 31. The improvement information generation unit 204 determines, for example, that as there is no "Radio Traffic Aggregation card", it is not possible to improve the line condition by a process relating to the functional parameter "Radio Traffic Aggregation".

Note that when, for example, the NE data collection unit 201 could not obtain the apparatus configuration information, the above-explained calculation may be performed without using the apparatus configuration information. However, the improvement information generation unit 204 can suggest an improvement method with a high accuracy taking into consideration a hardware configuration of the network equipment 31 by performing the above-explained calculation using the apparatus configuration information.

As described above, the improvement information generation unit 204 makes the determination on each functional parameter. After the improvement information generation unit 204 makes the determination on each functional parameter, the improvement information generation unit 204 generates and outputs the improvement information which will be presented to a user. An example of the improvement information generated from the data shown in FIG. 8 shall be explained with reference to FIG. 9.

FIG. 9 is a conceptual diagram showing a GUI screen output by the improvement information generation unit 204. The improvement information generation unit 204 displays a current use status of each functional parameter as shown in the drawing (e.g. "50 Mbps" which is a current use status of the functional parameter "Radio Capacity"). Further, the improvement information generation unit 204 displays what kind of improvement means is possible for each functional parameter as shown in the drawing ("Available", "Not Available", and "---(already processed)") and also displays buttons (e.g. a button 41) and the like for allowing a user to execute each improvement means. Note that the button is an example of an interface tool for accepting various operations from the user and may be another operation means such as, for example, a link or the like. The user refers to the GUI screen (FIG. 9) of the display apparatus that is connected to (or integrated with) the network management apparatus 20. Then, the user gives an instruction to execute the improvement means by operating an input apparatus such as a mouse. The improvement information generation unit 204 generates the GUI screen so that the control tool call unit 205, the license application processing unit 206, and the license purchase screen display unit 207, which will be described later, operate when the buttons are pressed.

The improvement information generation unit 204 desirably generates the GUI screen according to a type of the improvement means for improving the line condition (the setting change, the license application, and the license purchase) and displays the screen in such a way that the user can easily recognize the improvement process which is considered to be effective for the user. The improvement means which is considered to be effective for the user indicates that the line condition can be improved without purchasing the license (in other words, without spending money). That is, it is desirable for the user in general that the processes are performed in order of the setting change, the license application, and the license purchase. Accordingly, the improvement information generation unit 204 generates the GUI screen displaying the functional parameters sorted in order, as shown in FIG. 9, so that the setting change, the license application, and the license purchase can be performed. For example in FIG. 9, the improvement information generation unit 204 generates the interface in a matrix format in which the functional parameters "Radio Capacity" and "Radio Bit Rate" that can improve the line condition by only the setting change are displayed in upper columns.

Note that the improvement information generation unit 204 may provide a display effect other than the effect of sorting the functional parameters. The improvement information generation unit 204 may, for example, change colors of columns according to the type of the improvement means such as the setting change, the license application, and the license purchase. Alternatively, the improvement information generation unit 204 may display the screen so that it clearly shows the recommended improvement means (e.g. show "o (double circle)" for the parameter of which the setting can be changed).

Note that the improvement information may not be a form of the GUI (Graphic User Interface) as shown in FIG. 9 and may be CUI (Character User Interface) based information or file format information. That is, the improvement information generation unit 204 should only generate the improvement information that shows the improvement means which will be executed to improve the line condition, and a data format of the improvement information can be changed according to a need of the user. As described so far, the improvement information generation unit 204 functions also as a display unit for displaying the improvement information together with a current usage state of each parameter. Although it has been explained that the improvement information generation unit 204 presents three improvement methods, namely, the execution of the setting change of each functional parameter, the execution of the license application of each functional parameter, and the execution of the license purchase of each parameter, it is not limited to this, and the improvement information generation unit 204 may display one or more of these three improvement methods. The improvement information generation unit 204, for example, may provide a user interface that presents only whether or not the setting change of each functional parameter is possible and display only a method for improving the line condition for which there is no cost.

Referring again to FIG. 2. The control tool call unit 205 is called from the GUI screen or the like that is generated by the improvement information generation unit 204 as mentioned above. The control tool call unit 205 changes settings of the network equipment 31 to 3N. The control tool call unit 205, for example, changes the settings of the network equipment 31 to 3N by transmitting a functional parameter name and a parameter value which will be changed to a control tool inside the network equipment 31 to 3N.

The license application processing unit 206 is called from the GUI screen or the like generated by the improvement information generation unit 204 as mentioned above. The license application processing unit 206 performs the license application process of each functional parameter of the network equipment 31 to 3N.

The license purchase screen display unit 207 is called from the GUI screen or the like generated by the improvement information generation unit 204 as mentioned above. The license purchase screen display unit 207 receives information of the functional parameter that can improve the line condition by purchasing the license from the improvement information generation unit 204 and generates a screen for purchasing the license based on the information of the functional parameter. When the user operates the license purchase screen, an execution instruction is transmitted to the license management apparatus 10.

Figure 10:
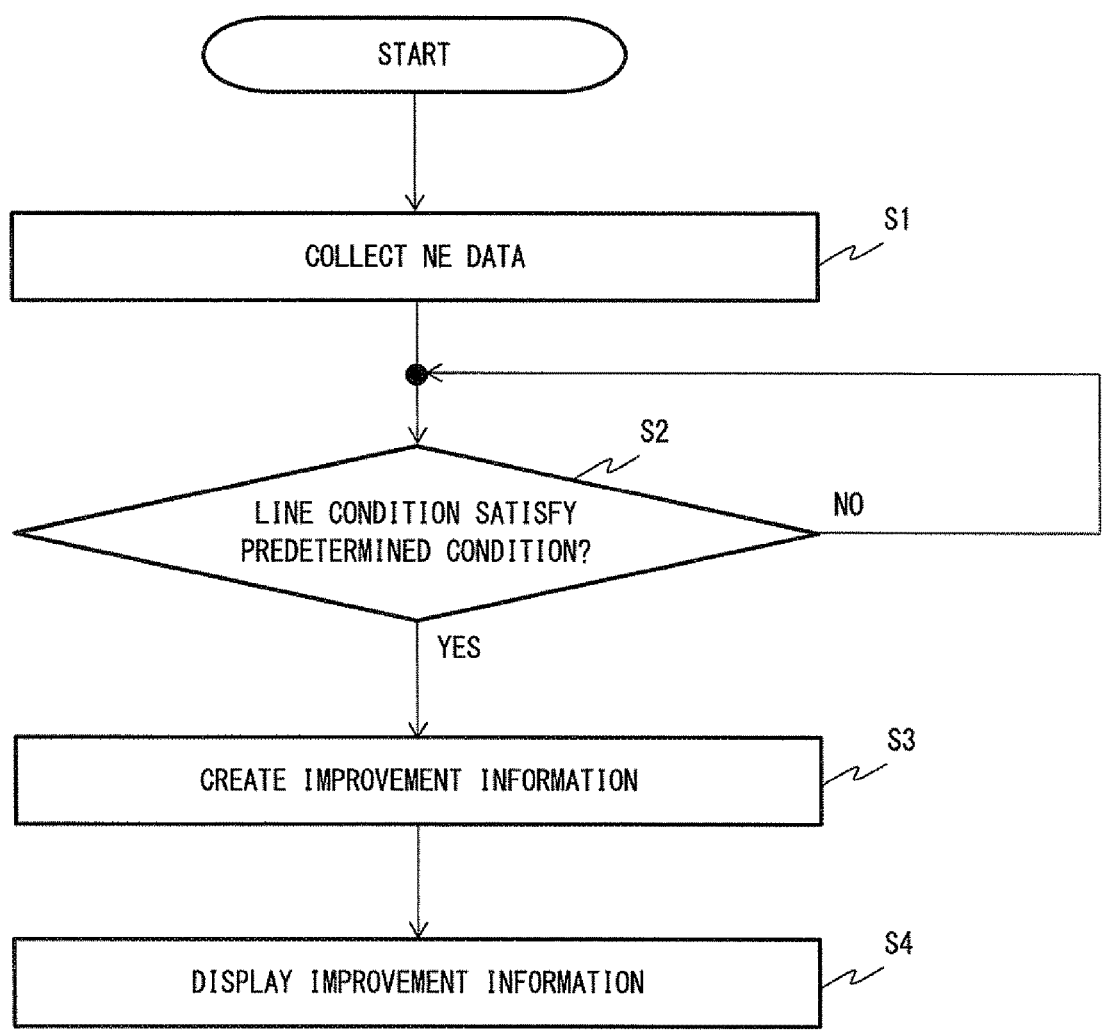
FIG. 10 is a flowchart showing a flow of processes by the network management apparatus 20 according to the first exemplary embodiment.

Next, an operation of the network management apparatus 20 according to this exemplary embodiment shall be explained again with reference to FIG. 10. FIG. 10 is a flowchart showing a flow of processes by the network management apparatus 20. In the following explanation, a case in which the network management apparatus 20 performs a process relating to the network equipment 31 shall be explained.

The NE data collection unit 201 collects the apparatus configuration information, the setting information, the applied license information, and the line communication information from the network equipment 31 (S1). Note that it is not necessary for the NE data collection unit 201 to sequentially collect the information other than the line communication information, and the NE data collection unit 201 may collect these pieces of information at a necessary timing (e.g. when a system starts to operate or the like).

The line condition determination unit 203 compares a line usage rate included in the collected line communication information with the previously set threshold and determines as to whether or not the line usage rate exceeds the threshold (S2). When the line usage rate does not exceed the threshold (S2: No), the line condition determination unit 203 continues the determination process.

When the line usage rate exceeds the threshold (S2: Yes), the line condition determination unit 203 notifies the improvement information generation unit 204. The improvement information generation unit 204 which has received the notification creates the improvement information by the above-mentioned method (S3) and displays the created improvement information (S4).

Next, effects of the network management apparatus 20 according to this exemplary embodiment shall be explained as follows. The network management apparatus 20 according to this exemplary embodiment determines as to whether or not the line conditions of the network equipment (the communication equipment) 31 to 3N satisfy a predetermined condition (e.g. whether or not the line usage rate is greater than or equal to the threshold), and if the predetermined condition is satisfied, the network management apparatus 20 generates and outputs the improvement information describing the means for improving the line condition based on the operation information (the setting information, the applied license information and the like). The user (preferably an administrator of the network management apparatus 20) refers to this improvement information to easily understand the means to use for improving the line condition. This reduces time and effort needed by the user.

To be more specific, the network management apparatus 20 compares the setting information, the applied license information, and the purchased license information to one another and calculates the means that can improve the line condition of the network equipment 31 for each functional parameter. As the network management apparatus 20 considers the setting information and the like of the network equipment 31, it is possible to suggest the improvement method corresponding to a setting state and the like of the network equipment 31.

Moreover, the network management apparatus 20 calculates the improvement method in consideration of the apparatus configuration information including the information regarding the hardware configuration of the network equipment 31. This solves the problem of suggesting an improvement method that cannot be achieved by the network equipment 31 in terms of its hardware and enables a suggestion of an improvement method with a high accuracy.

The above-mentioned exemplary embodiments are merely examples to which technical ideas achieved by the present inventor have been applied. That is, it is obvious that the technical ideas are not limited to the above-mentioned exemplary embodiment, and various modification can be made therein In the above explanation, for example, although it has been explained that the license management apparatus 10 and the network management apparatus 20 are provided in the network system 1, it is not necessarily limited to this. Alternatively, a single management apparatus including the functions of the license management apparatus 10 and the network management apparatus 20 may be provided. Further alternatively, the network management apparatus 20 may have a cluster configuration comprised of a plurality of computer apparatuses.

Additionally, the network management apparatus 20 may generate the improvement information in consideration of a relationship between the network equipment. In some cases, for example, the settings of the network equipment 31 and the network equipment 32 are preferably the same in terms of an operational issue. In this case, the network management apparatus 20 may be configured to simultaneously set the network equipment 31 and the network equipment 32 or to output the improvement information for the network equipment 31 and the network equipment 32 at the same time.

The functions of the various processing units (the NE data collection unit 201, the line condition determination unit 203, the improvement information generation unit 204, the control tool call unit 205, the license application processing unit 206, and the license purchase screen display unit 207) inside the network management apparatus 20 can be realized by a program operating inside an arbitrary computer. That is, the network management apparatus 20 is a so-called computer and achieves the processes of the above-mentioned processing units by executing the program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 11:
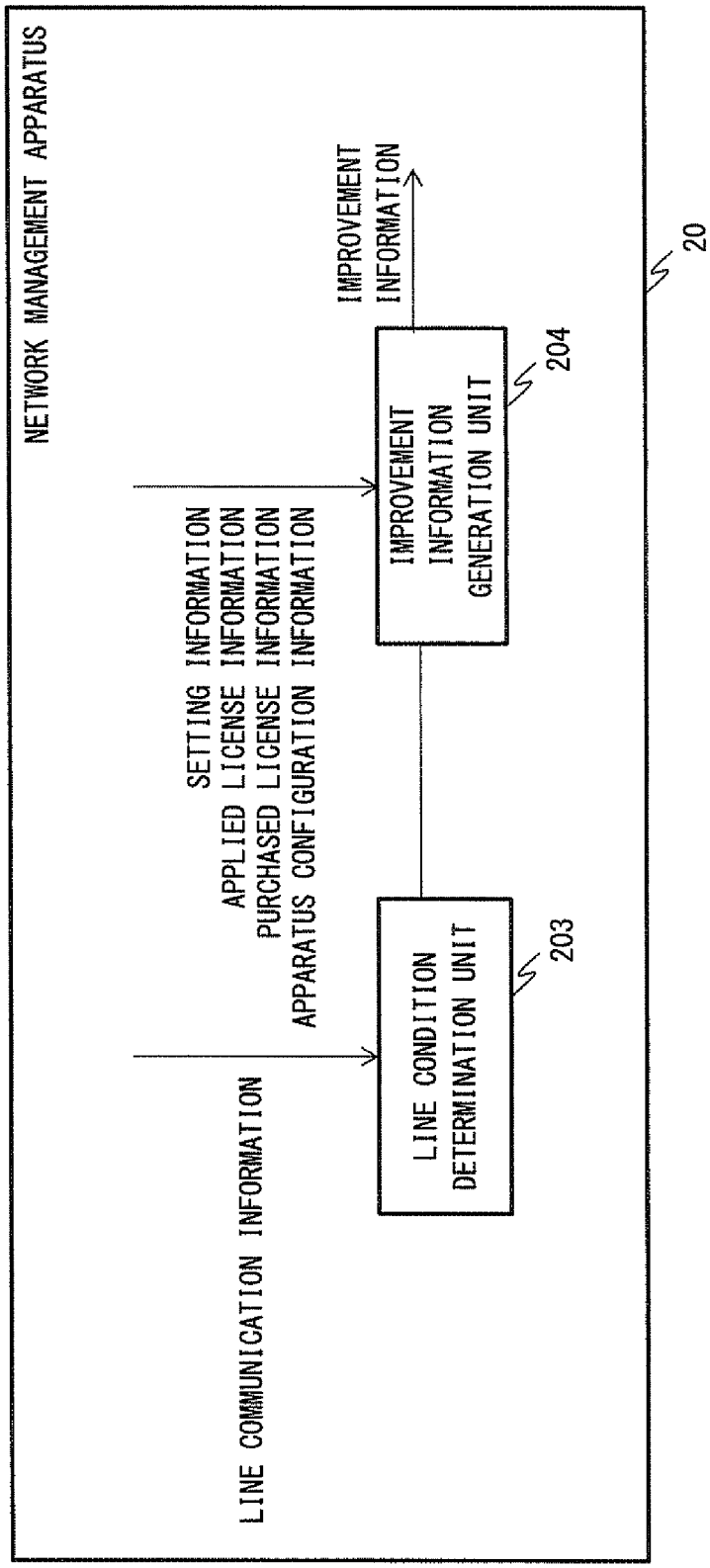
FIG. 11 is a block diagram showing a schematic configuration of the network management apparatus 20 according to the present invention.

Lastly, an operation of the network management apparatus 20 according to the present invention shall be explained again with reference to FIG. 11. The line condition determination unit 203 receives a line communication condition of the network equipment (the communication equipment) 31 and determines as to whether or not this line communication condition satisfies a predetermined condition. When the line communication condition satisfies the predetermined condition, the line condition determination unit 203 notifies the improvement information generation unit 204.

The improvement information generation unit 204 obtains the operation information relating to the network equipment 31 (the information including the setting information, the applied license information, the purchased license information, and the apparatus configuration information). After the improvement information generation unit 204 receives the notification from the line condition determination unit 203, the improvement information generation unit 204 generates and outputs the improvement information describing the means for improving the line condition of the network equipment 31 based on this operation information.

The user (preferably an administrator of the network management apparatus 20) refers to this improvement information to easily understand the means to use for improving the line condition. This reduces time and effort needed by the user.

Although the present invention has been explained with reference to the exemplary embodiment, the present invention is not limited by the above. Various modifications, obvious to those skilled in the art, can be made to the configurations and details of the present invention within the scope of the invention.

The present application claims priority rights of and is based on Japanese Patent Application No. 2013-157611 filed on Jul. 30, 2013 in the Japanese Patent Office, the entire contents of which are hereby incorporated by reference.

REFERENCE SIGNS LIST

1 NETWORK SYSTEM
10 LICENSE MANAGEMENT APPARATUS
101 STORAGE UNIT
20 NETWORK MANAGEMENT APPARATUS
201 NE DATA COLLECTION UNIT
202 STORAGE UNIT
203 LINE CONDITION DETERMINATION UNIT
204 IMPROVEMENT INFORMATION GENERATION UNIT
205 CONTROL TOOL CALL UNIT
206 LICENSE APPLICATION PROCESSING UNIT
207 LICENSE PURCHASE SCREEN DISPLAY UNIT
31 TO 3N NETWORK EQUIPMENT (NE)
41 BUTTON

The invention claimed is:

1. A network management apparatus comprising:
non-transitory computer-readable media storing program instructions; and
at least one processor configured to execute the instructions to:
determine as to whether or not a line condition of a communication apparatus satisfies a predetermined condition, the line condition being obtained from the connected communication apparatus; and
generate improvement information based on operation information when the line condition is determined to satisfy the predetermined condition, the improvement information being information that describes methods for improving the line condition, and the operation information being information regarding an operation of the communication apparatus, wherein
the operation information includes setting information relating to an operation setting of each functional parameter of the communication apparatus, applied license information relating to a license application state of each functional parameter of the communication apparatus, and license purchase information relating to a license permission state of each functional parameter of the communication apparatus, and
the improvement information generation unit generates the improvement information based on a mutual comparison between the setting information, the applied license information, and the license purchase information.

2. The network management apparatus according to claim 1, wherein
the operation information further includes apparatus configuration information relating to a hardware configuration of the communication apparatus, and
the at least one processor is further configured to execute the instructions to calculate methods for improving the line condition that cannot be achieved by the communication apparatus based on the apparatus configuration information and reflects the methods in the improvement information.

3. The network management apparatus according to claim 1, wherein
the at least one processor is further configured to execute the instructions to generate and output an interface screen that can allow a selection of the improvement information, namely, an execution of a setting change of each functional parameter of the communication apparatus, an execution of a license application of each functional parameter of the communication apparatus, and an execution of a license purchase of each functional parameter of the communication apparatus.

4. The network management apparatus according to claim 3, wherein
the at least one processor is further configured to execute the instructions to generate the interface screen in a matrix display format that displays the functional parameter capable of improving the line condition by the execution of the setting change in an upper column.

5. The network management apparatus according to claim 3, wherein
the at least one processor is further configured to execute the instructions to generate the interface screen in which the functional parameter capable of improving the line condition by the setting change is marked with a predetermined symbol.

6. The network management apparatus according to claim 3, wherein the at least one processor is further configured to execute the instructions to:
set an operation of each functional parameter of the communication apparatus in response to an operation on the interface screen.

7. The network management apparatus according to claim 1, wherein the at least one processor is further configured to execute the instructions to
determine whether or not the line condition of the communication apparatus exceeds a predetermined threshold.

8. A non-transitory computer readable medium storing a program for causing a computer to execute processes of:
determining as to whether or not a line condition of a communication apparatus satisfies a predetermined condition; and
when the line condition is determined to satisfy the predetermined condition, generating improvement information based on operation information, the improvement information being information that describes methods for improving the line condition, and the operation information relating to an operation of the communication apparatus, wherein
the operation information includes setting information relating to an operation setting of each functional parameter of the communication apparatus, applied license information relating to a license application state of each functional parameter of the communication apparatus, and license purchase information relating to a license permission state of each functional parameter of the communication apparatus, and in the generation of the improvement information, the improvement information is generated based on a mutual comparison between the setting information, the applied license information, and the license purchase information.

9. A non-transitory computer readable medium storing the program according to claim 8, wherein
the operation information further includes apparatus configuration information, the apparatus configuration information relating to a hardware configuration of the communication apparatus, and
in the generation of the improvement information, methods for improvement that are not possible to be achieved by the communication apparatus are calculated based on the apparatus configuration information and the methods are reflected in the improvement information.

10. A non-transitory computer readable medium storing the program according to claim 8, wherein
in the generation of the improvement information, an interface screen that allows a selection of the improvement information, namely, an execution of a setting change of each functional parameter of the communication apparatus, an execution of a license application of each functional parameter of the communication apparatus, and an execution of a license purchase of each functional parameter of the communication apparatus is generated and output.

11. A non-transitory computer readable medium storing the program according to claim 10, wherein
in the generation of the improvement information, the interface screen in a matrix format that displays the functional parameter capable of improving the line condition in an upper column is generated.

12. A non-transitory computer readable medium storing the program according to claim 10, wherein
in the generation of the improvement information, the interface screen in which the functional parameter capable of improving the line condition by the setting change is marked with a predetermined symbol is generated.

13. The non-transitory computer readable medium storing the program according to claim 10, wherein
the program causes the computer to further execute a process of:
performing an operation setting of each functional parameter of the communication apparatus in response to an operation on the interface screen.

14. A non-transitory computer readable medium storing the program according to claim 8, wherein
in the determination of the line condition, it is determined as to whether or not the line condition of the communication apparatus exceeds a predetermined threshold.

15. A method of improving a line condition comprising:
determining as to whether or not the line condition of a communication apparatus satisfies a predetermined condition, and
generating improvement information based on operation information when the line condition is determined to satisfy the predetermined condition, the improvement information being information that describes methods for improving the line condition, and the operation information relating to an operation of the communication apparatus, wherein
the operation information includes setting information relating to an operation setting of each functional parameter of the communication apparatus, applied license information relating to a license application state of each functional parameter of the communication apparatus, and license purchase information relating to a license permission state of each functional parameter of the communication apparatus, and
in the generation of the improvement information, the improvement information is generated based on a mutual comparison between the setting information, the applied license information, and the license purchase information.

16. The method according to claim 15, wherein
the operation information further includes apparatus configuration information, the apparatus configuration information relating to a hardware configuration of the communication apparatus, and
in the generation of the improvement information, methods for improvement that are not possible to be achieved by the communication apparatus are calculated based on the apparatus configuration information and the methods are reflected in the improvement information.

17. The method according to claim 15, wherein
in the generation of the improvement information, an interface screen that allows a selection of the improvement information, namely, an execution of a setting change of each functional parameter of the communication apparatus, an execution of a license application of each functional parameter of the communication apparatus, and an execution of a license purchase of each functional parameter of the communication apparatus is generated and output.

18. The method according to claim 17, wherein
in the generation of the improvement information, the interface screen in a matrix format that displays the functional parameter capable of improving the line condition by the execution of the setting change in an upper column is generated.

19. The method according to claim 17, wherein
in the generation of the improvement information, the interface screen in which the functional parameter capable of improving the line condition by the setting change is marked with a predetermined symbol is generated.

20. The method according to claim 17, further comprising:
performing an operation setting of each functional parameter of the communication apparatus in response to an operation on the interface screen.

21. The method according to claim 15, wherein
in the determination of the line condition, it is determined as to whether or not the line condition of the communication apparatus exceeds a predetermined threshold.

22. A management apparatus of a communication apparatus that:
stores functional parameter information, the functional parameter information indicating availability of each function included in the communication apparatus; and
instructs a display unit to display suggestion information for improving a line condition of the communication apparatus, wherein
the suggestion information includes information indicating a change in the functional parameter information, and
the suggestion information further includes information indicating an application or a purchase of a license necessary for the change in the functional parameter information, wherein the suggestion information is generated based on operation information relating to an operation of the communication apparatus, and the operation information includes setting information relating to an operation setting of each functional parameter of the communication apparatus, applied license information relating to a license application state of each functional parameter of the communication apparatus, and license purchase information relating to a license permission state of each functional parameter of the communication apparatus.

23. The management apparatus according to claim 22, wherein the management apparatus further instructs the display unit to display an interface tool corresponding to the suggestion information, and the management apparatus executes an operation corresponding to the suggestion information in response to an operation on the interface tool.

24. A management apparatus of a communication apparatus that:

stores functional parameter information, the functional parameter information indicating availability of each function included in the communication apparatus; and instructs a display unit to display suggestion information for improving a line condition of the communication apparatus, wherein the suggestion information includes information indicating a change in the functional parameter information, the suggestion information further includes information indicating an application or a purchase of a license necessary for the change in the functional parameter information, and the management apparatus instructs the display unit to display the functional parameter information that is capable of improving the line condition by an execution of a setting change in an upper column in a matrix display format.

25. A management apparatus according to of a communication apparatus that:

stores functional parameter information, the functional parameter information indicating availability of each function included in the communication apparatus; and instructs a display unit to display suggestion information for improving a line condition of the communication apparatus, wherein the suggestion information includes information indicating a change in the functional parameter information, the suggestion information further includes information indicating an application or a purchase of a license necessary for the change in the functional parameter information, and the management apparatus instructs the display unit to display the functional parameter information that is capable of improving the line condition by the setting change by marking the functional parameter information with a predetermined symbol.

\* \* \* \* \*